US008577486B2

(12) United States Patent
Unver et al.

(10) Patent No.: US 8,577,486 B2
(45) Date of Patent: Nov. 5, 2013

(54) METHOD AND APPARATUS FOR CONTEXTUALIZING ENERGY CONSUMPTION DATA

(75) Inventors: Hakki Ozgur Unver, Brighton, MA (US); Giri Tippireddy, Fremont, CA (US); Aravindan Sankaramurthy, Foster City, CA (US); Yong Feng, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 358 days.

(21) Appl. No.: 13/006,475

(22) Filed: Jan. 14, 2011

(65) Prior Publication Data
US 2012/0185104 A1    Jul. 19, 2012

(51) Int. Cl.
*G06F 19/00* (2011.01)
(52) U.S. Cl.
USPC ................................ 700/95; 705/80; 705/317
(58) Field of Classification Search
USPC ....................................... 700/95; 705/80, 317
See application file for complete search history.

(56) References Cited

U.S. PATENT DOCUMENTS

| 2005/0096797 A1* | 5/2005 | Matsubara et al. | 700/291 |
| 2008/0177678 A1* | 7/2008 | Di Martini et al. | 705/412 |
| 2009/0112522 A1* | 4/2009 | Rasmussen | 702/186 |
| 2010/0082499 A1* | 4/2010 | Luff | 705/317 |
| 2011/0231320 A1* | 9/2011 | Irving | 705/80 |

FOREIGN PATENT DOCUMENTS

GB       2444958 A    6/2008

OTHER PUBLICATIONS

Vykon, "Intelligent Energy Management", http://www.tridium.com/galleries/brochures/Vykon_Energy_FINAL.pdf, 2007, pp. 1-6, Tridium, Inc.
G.E., "Accelerator Manufacturing Energy Management Solution", http://www.ge-ip.com/products/3426, 2010, pp. 1-2, General Electric Company.
Siemens AG, "SIMETEL Energy Management System", http://is.industry.siemens.com/broschueren/pdf_open.html? id=2568, 2010, pp. 1-2, Siemens AG, Germany.
David Berger, "Energy management and the CMMS", http://www.plantservices.com/articles/2010/03AssetManager.html, Mar. 2010, pp. 1-2, PlantServices.com.
Sonal et al., "Intelligence and Decision Support through Web Based Integrated Semantic and Geospatial Platforms", http://www.gisdevelopment.net/technology/emerging/mwf09_ashishsonal.htm, 2009, pp. 1-5.

(Continued)

*Primary Examiner* — Mohammad Ali
*Assistant Examiner* — Anthony Whittington
(74) *Attorney, Agent, or Firm* — Kraguljac Law Group, LLC

(57) ABSTRACT

Systems, methods, and other embodiments associated with contextualizing energy consumption are described. One example method includes accessing stored energy consumption data and stored operation status data from production-related equipment; correlating the operation status data with the energy consumption data; and categorizing energy consumed by the production-related equipment as value-added or non-value-added based, at least in part, on the correlating of the operation status data with the energy consumption data. The example methods may also include determining an energy classification for an energy-consuming entity; identifying child entities of the energy-consuming entity; accessing energy consumption data for the energy-consuming entity and the child entities; aggregating the energy consumption data for the energy-consuming entity and the child entities; and classifying the aggregated energy consumption data with the energy classification for the energy-consuming entity.

16 Claims, 6 Drawing Sheets

(56) References Cited

OTHER PUBLICATIONS

Keahey et al., "Contextualization: Providing One-Click Virtual Clusters", http://www.mcs.anl.gov/uploads/cels/papers/62884-revised.pdf, pp. 1-8.

"Objectives of Data Collection", http://www.fao.org/docrep/003/x2465e/x2465e06.htm, pp. 1-6.

Gedik et al., "Energy-Aware Data Collection in Sensor Networks: A Localized Selective Sampling Approach", http://www.cercs.gatech.edu/tech-reports/tr2005/gitcercs-05-18.pdf", 2005, pp. 1-34.

Reimer, et al., "Aml based Decision Making Support System for Energy Efficiency in Manufacturing SMEs", http://www.ami-moses.eu/fileadmin/templates/amimoses/files/111_Reimer_Opaper.pdf, pp. 1-8.

\* cited by examiner

METHOD AND APPARATUS FOR CONTEXTUALIZING ENERGY CONSUMPTION DATA

BACKGROUND

Governments, consortiums and regulatory agencies all over the world are moving to regulate green house gas (GHG) emissions. In response to the increasing regulation of GHG emissions and public interest in promoting "sustainable" manufacturing facilities, industries are increasing efforts to manage their energy use. This management typically involves optimizing energy usage and minimizing energy loss. Energy-aware manufacturing is becoming the new paradigm for industry when making business decisions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

In implementing energy efficiency improvements and creating energy-aware manufacturing processes, companies employ energy monitoring and management systems that can collect real-time energy consumption data. While the energy consumption data and other gathered data can be accessed separately, existing energy-management systems do not correlate the energy consumption data with production activity data. This lack of correlation hampers managers' ability to make informed business decisions regarding their energy consumption. The contextualization techniques described herein correlate production activity with energy consumption to provide actionable metrics (e.g.), key performance indicators (KPIs)) for decision making.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks that are not illustrated.

Figure 1:
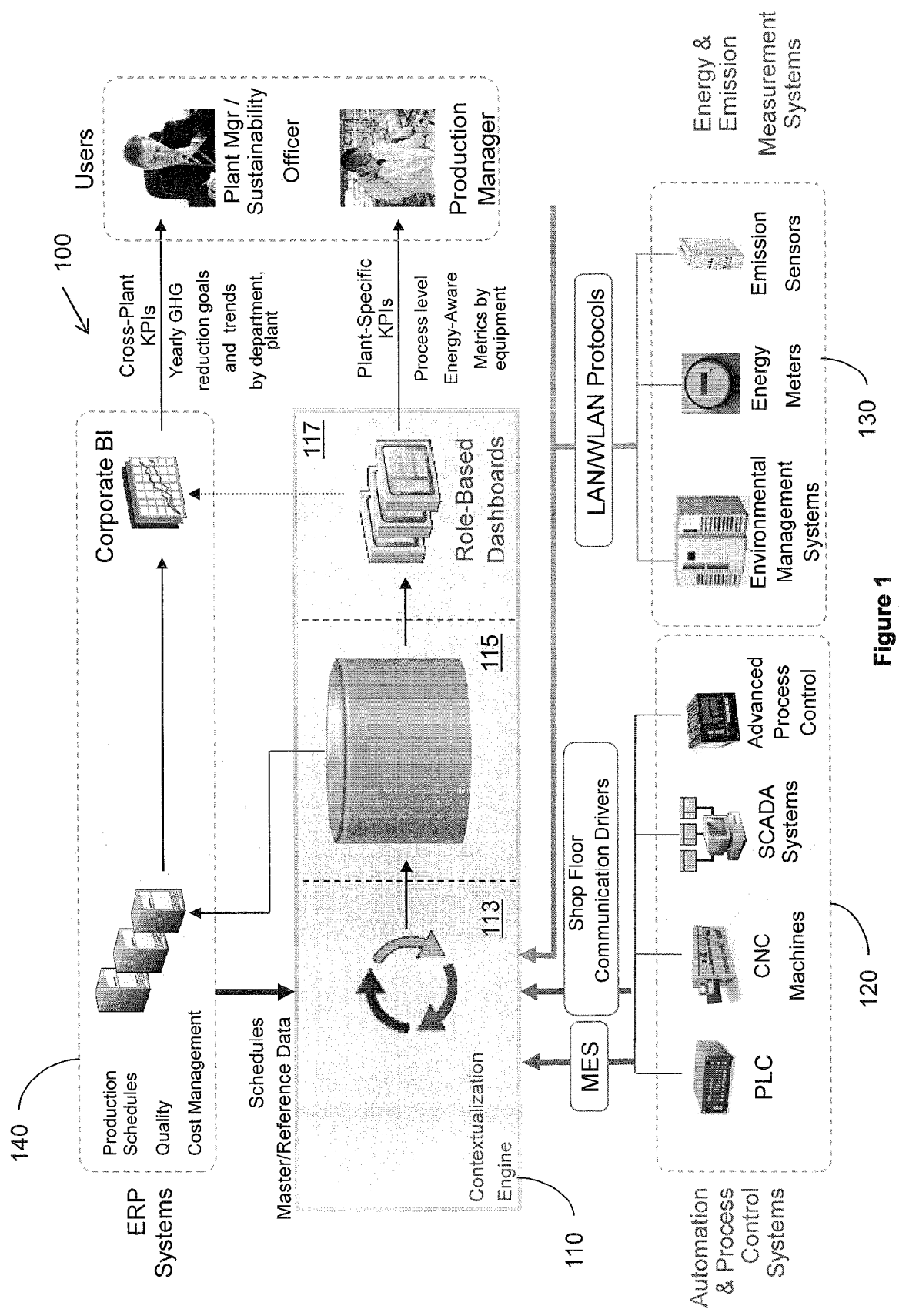
FIG. 1 illustrates an example embodiment of a system associated with contextualization of energy consumption data.

FIG. 1 schematically illustrates a manufacturing facility 100 that includes an example embodiment of an energy management system 110. The energy management system 110 collects production activity data from automation and process control systems 120 on the shop floor. Automation and process control systems 120 include PLCs (programmable logic controllers), CNC (computerized numerical control) machines, and SCADA (supervisory control and data acquisition) systems. Data from the automation and process control systems 120 provides detailed information about the real-time operation of production-related equipment. This data may be acted on by a manufacturing execution system (MES) prior to being stored in a manufacturing operations and sustainability data model 115.

The energy management system 110 also collects energy consumption information from energy and emission measurement systems 130. Energy and emission measurement systems 130 include environmental management systems, energy meters, and emission sensors. The collected energy consumption data is stored in the manufacturing operations and sustainability data model 115.

A third input to the energy management system 110 is an enterprise resource planning (ERP) system 140. The enterprise resource planning system 140 provides production scheduling data related to production control, MES, quality control, and cost management, among other things. This data includes data related to production of specific products, including scheduling, Bills of Materials, and work-orders. The product-related data is also stored in the manufacturing operations and sustainability data model 115.

In one example embodiment, the manufacturing operations and sustainability data model 115 is a model that complies with ISA-95. The manufacturing operations and sustainability data model 115 is constructed as a hierarchical structure of entities such as sites and equipment. Users of the manufacturing operations and sustainability data model 115 can model their particular manufacturing operation using the hierarchy. Users can tag entities within the hierarchy with attributes so that the entities can be grouped according to the attributes for data summarization. Users can also attach definitions to input values. For example, a user may define a specified combination of inputs from components of CNC machine as indicating that the CNC machine is actively producing parts. Data provided by the various components of the hierarchy is stored in the manufacturing operations and sustainability data model 115 so that summaries, such as dashboards 117 that reflect a current state of the manufacturing operation's condition can be provided. End users of the energy management system 110 include personnel at various levels in the enterprise from corporate management to production floor.

The energy management system 110 includes a contextualization engine 113 that correlates production data from the automation and process control systems 120 with energy consumption data from the energy and emission measurement systems 130. This correlation provides important context information to better inform energy management decisions. The contextualized energy consumption data is presented as Key Performance Indicators (KPIs) including a value-added/non-value-added energy KPI and a direct/indirect energy consumption KPI.

Figure 2:
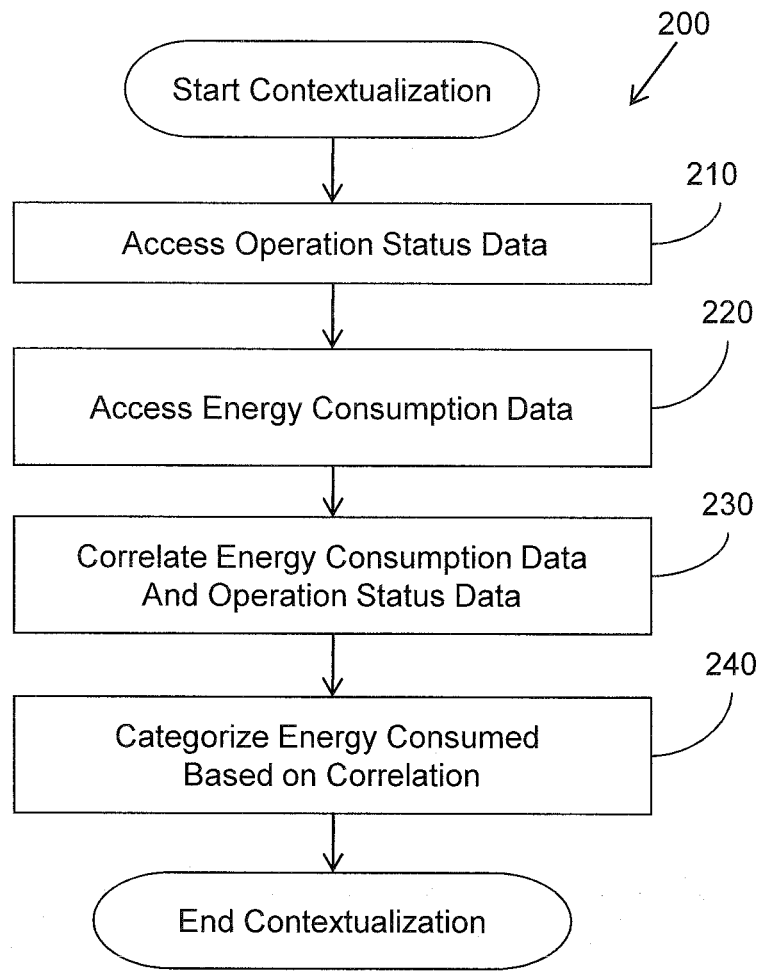
FIG. 2 illustrates an example embodiment method associated with contextualization of energy consumption data.

FIG. 2 illustrates an example embodiment of a contextualization method 200. The method includes, at 210, accessing stored operation status data from production-related equipment. At 220, stored energy consumption data for the production-related equipment is accessed. At 230, the method includes correlating the operation status data with the energy consumption data. At 240, energy consumed by the production-related equipment is categorized as value-added or non-value-added based, at least in part, on the correlating of the operation status data with the energy consumption data.

In one example embodiment, the operation status data and energy consumption data are both stored as a function of time to facilitate correlating the operation status and energy consumption in time. In this manner, energy consumption that occurs while operation status data indicates that production-related equipment is engaged in a production activity can be classified as value-added energy.

A user interface may be provided to allow a user to classify one or more production-related equipment status values as indicating that the production-related equipment is engaged in a production activity or indicating that the production-related equipment is not engaged in a production activity. For example, by way of the user interface, the user may define machine status RUN as indicating that the production-related equipment is engaged in a production activity while machine statuses IDLE and DOWN can be defined as indicating that the production-related equipment is not engaged in a production activity.

In one embodiment, the method 200 may also include accessing production scheduling data that identifies one or more products being processed by the production-related equipment in a specific time period. The production scheduling data is correlated with the categorized energy consumption. In this manner, categorized energy consumption data can be aggregated according to the one or more products being processed by the production-related equipment for reporting purposes.

While FIG. 2 illustrates various actions occurring in serial, it is to be appreciated that various actions illustrated in FIG. 2 could occur substantially in parallel. By way of illustration, a first process could access stored operation status data and energy consumption data, a second process could correlate the operation status data and energy consumption data, and a third process could categorize the energy consumed based on the correlation. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes accessing stored operation status data from production-related equipment; accessing stored energy consumption data for the production-related equipment; correlating the operation status data with the energy consumption data; and categorizing energy consumed by the production-related equipment as value-added or non-value-added based, at least in part, on the correlating of the operation status data with the energy consumption data.

While executable instructions associated with the above method are described as being stored on a computer-readable medium, it is to be appreciated that executable instructions associated with other example methods described herein may also be stored on a computer-readable medium.

Figure 3:
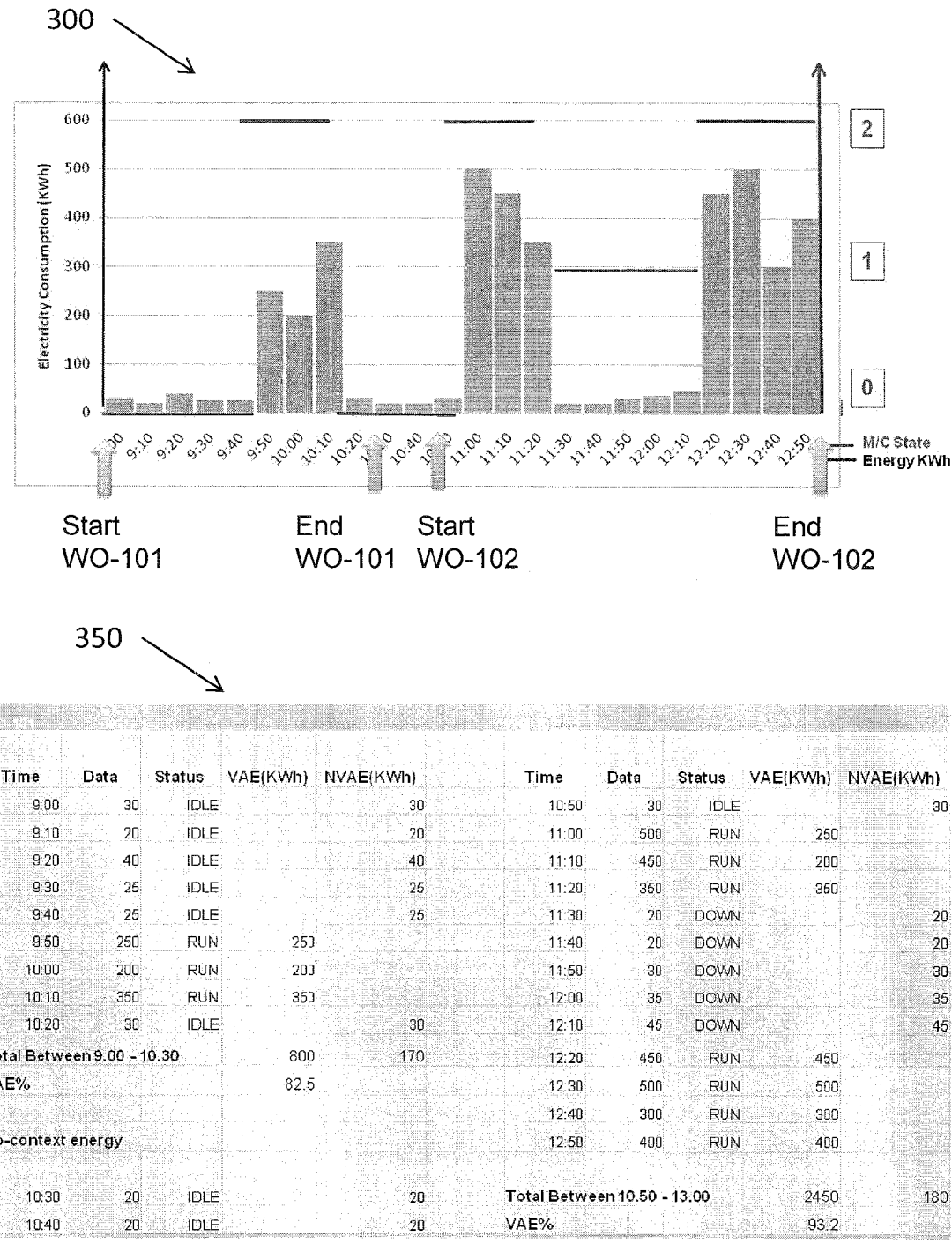
FIG. 3 illustrates operation of an example system associated with contextualization of energy consumption data.

FIG. 3 includes a plot 300 that illustrates an example embodiment of contextualization between energy consumption data and operation status data. The plot 300 charts energy consumption (left Y axis) and operation status (right Y axis) as a function of time (X axis). The operation status data is received from a CNC machine that provides its operational status by way of a PLC tag or other input. As shown on the plot 300, operation status data can have one of three values: "0" which indicates that the machine is IDLE, "1" which indicates that the machine is DOWN, and "2" which indicates that the machine status is RUN. For the purposes of this description, a machine status of IDLE or DOWN has been defined as indicating that machine is not engaged in a production activity and thus the energy consumed is non-value-added. The machine status of RUN has been defined as indicating that the machine is engaged in a production activity and thus the energy consumed is value-added. Other machine statuses that may be defined as indicating that the machine is not engaged in a production activity include WAIT and ALARM.

Production scheduling data is also shown along the X axis of plot 300. Work-order WO-101 is illustrated being started at 9:00 AM and being finished at 10:20 AM. Similarly, work-order WO-102 is illustrated being started at 10:50 AM and being finished at 1:00 PM. The production scheduling data is provided by an ERP system and typically includes the work-order number, a part number for the part being produced, a quantity, and number of operation steps. The actual start time and actual finish time may be provided by the ERP system, the machine or PLC engaged in the production activity or other input methods.

A value-added energy KPI is reported in chart 350. The value-added KPI associated with WO-101 is shown on the left while the value-added KPI associated with WO-102 is shown on the left. As can be seen from the chart 350, the total value-added energy consumed in processing WO-101 was 800 KWh. This corresponds to the amount of energy consumed when the CNC machine was in the RUN state and engaged in a production activity. The total non-value-added energy consumed during processing of WO-101 was 170 KWh, corresponding to the energy consumed while the CNC machine was in the IDLE state. Thus, the percentage of value-added energy for WO-101 was 82.5%. Likewise, the total value-added energy consumed in processing WO-102 was 2450 KWh while the total non-value-added energy consumed was 180 KWh (consumed while the CNC machine was in the DOWN state). Thus, the percentage of value-added energy for WO-102 was 93.2%. No production scheduling contextualization was provided for the energy that was consumed in between the end of WO-101 and the start of WO-102 (10:30-10:40 AM).

A comparison of the value-added energy KPIs for WO-101 and WO-102 indicates that the processing of WO-102 was significantly more efficient, in terms of energy consumption, than the processing of WO-101. This may prompt management to investigate the processing of WO-101 for potential energy consumption improvement. Without the improved granularity provided by the value-added energy KPI, management may have prioritized WO-102 for energy consumption improvement over WO-101 based on a total amount of energy consumed, a total time to process the work order, or the fact that the CNC machine went down during processing of WO-102.

Figure 4:
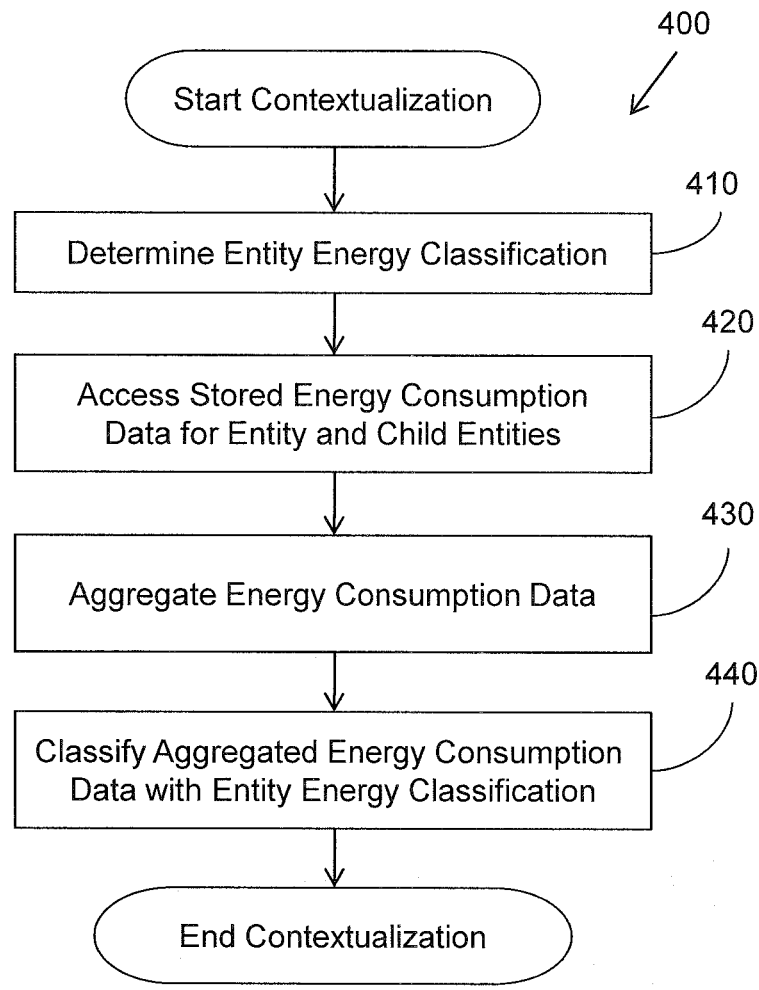
FIG. 4 illustrates another example embodiment of a method associated with contextualization of energy consumption data.

FIG. 4 illustrates another example embodiment of a contextualization method 400. At 410, the method includes determining an energy classification for an energy-consuming entity. One example energy classification includes a direct energy consumption classification vs. an indirect energy consumption classification. Direct energy consumption may be assigned to departments or groups of equipment that are associated with production activities such as manufacturing, machining, painting, and so on. Indirect energy consumption may be assigned to departments of groups of equipment that are not associated with production activities such as research and development, human resources, purchasing, and so on.

At 420, the method includes identifying child entities of the energy-consuming entity. This identification may be performed by accessing a hierarchical model of energy-consuming entities to determine entities that are children with respect to the energy consuming entity, It should be noted that the various child entities may have been individually flagged as being related to production or not related to production. At 430, the method includes aggregating energy consumption data for the energy-consuming entity and the child entities. At 440, the method includes classifying the aggregated energy consumption data with the energy classification for the energy-consuming entity. Thus in the contextualization method 400, the aggregation of the energy consumption data is given the energy classification of the parent entity, regardless of any given child entity's relationship to production.

While FIG. 4 illustrates various actions occurring in serial, it is to be appreciated that various actions illustrated in FIG. 4 could occur substantially in parallel. By way of illustration, a first process could determine an entity's energy classification, a second process could access energy consumption data, a third process could aggregate the energy consumption data for the entity and child entities, and a fourth process could classify the aggregated energy consumption with the entity's energy classification. While four processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes determining an energy classification for an energy-consuming entity; identifying child entities of the energy-consuming entity; aggregating the energy consumption data for the energy-consuming entity and the child entities; and classifying the aggregated energy consumption data with the energy classification for the energy-consuming entity.

Figure 5:
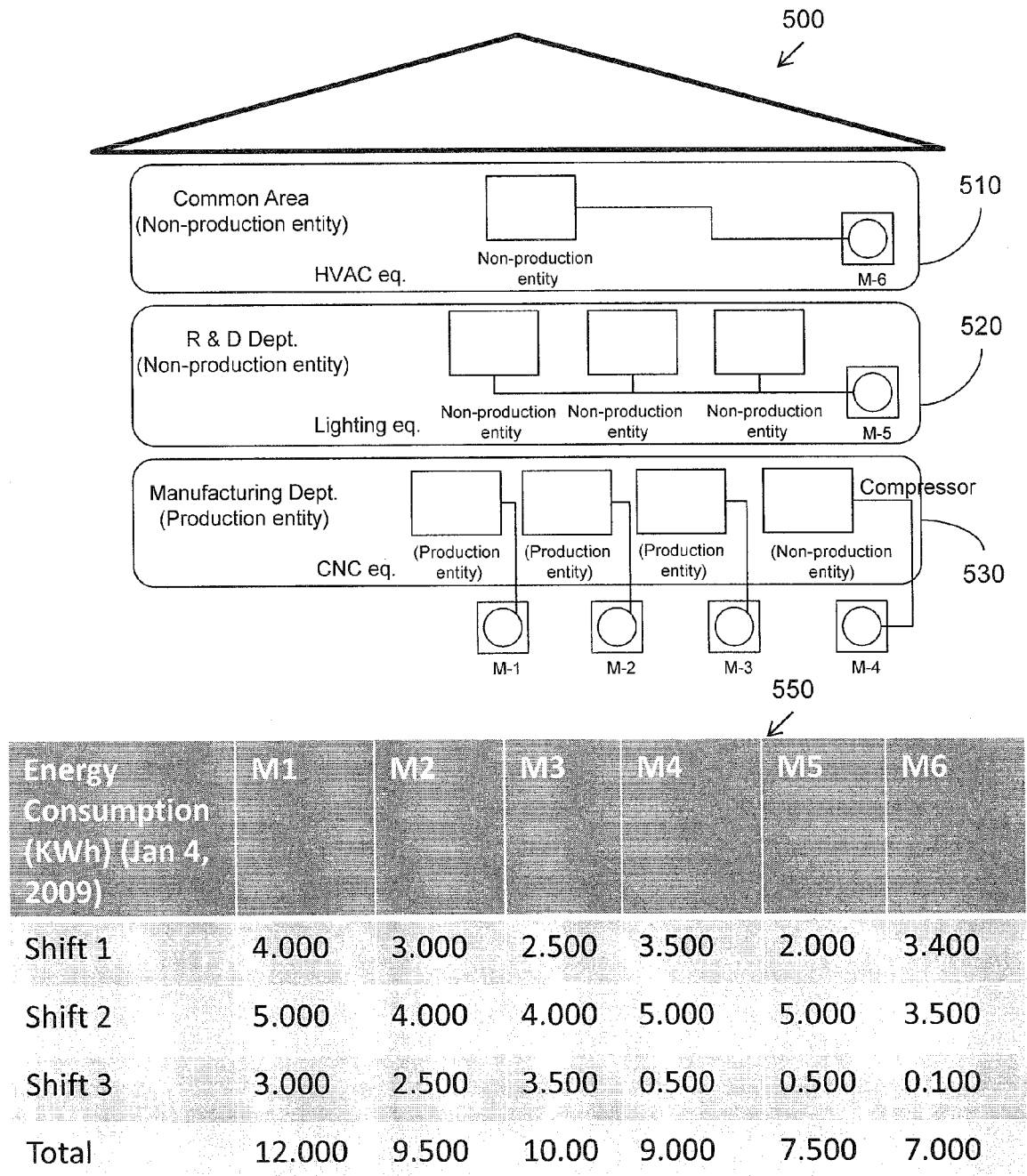
FIG. 5 illustrates operation of another example system associated with contextualization of energy consumption data.

FIG. 5 presents an example of a direct energy consumption KR that aggregates the energy consumed by child entities associated with a given entity and classifies the aggregated energy consumption based on the classification of the given entity. For example, if an entity is tagged as a production entity, the aggregated energy of its children will be classified as direct energy consumption.

FIG. 5 schematically illustrates an example embodiment of a facility 500 that has been defined in the hierarchical manufacturing operation model as including three energy consuming entities: a common area 510, a research and development (R&D) department 520, and a manufacturing department 530. The common area 510 and the R&D department 520 have been tagged as being non-production entities. The manufacturing department 530 has been tagged as being a production entity. The manufacturing department has four energy meters that measure its energy consumption. Meters M-1, M-2, and M-3 monitor energy consumed by CNC machines that have been designated as production entities. Meter M-4 measures energy consumed by an air compressor that has been designated as a non-production entity. The R&D department has one energy meter M-5 that measures energy consumed by lighting fixtures that have been designated as non-production entities. The common area has one energy meter M-6 that measures energy consumed by an HVAC unit that has been designated as a non-production entity.

A chart 550 lists energy consumption measured by the meters M-1 through M-6 for Jan. 4, 2009 during three shifts. Using the direct energy consumption KPI, the total direct energy consumption is M1+M2+M3+M4 or 22.5 KWh. This represents the total energy consumed by the manufacturing department 530, including the air compressor metered by M-4 which was tagged as being a non-production related entity. The total indirect energy consumption is M5+M6, both of which are associated with a non-production entity, or 14.5 KWh.

The direct energy consumption KPI allows aggregation of energy consumed by departments in a broad sense according to their relation to production. This provides an additional perspective to users of the energy management system. For example, classifying each child entity's energy consumption according to the entity's own status would have caused the data from M-4 to be aggregated with M-5 and M-6. However, since the air compressor metered by M-4 is part of a production-related department, it may be appropriate in some instances to aggregate the energy consumed by the air compressor with the other manufacturing department equipment.

Figure 6:
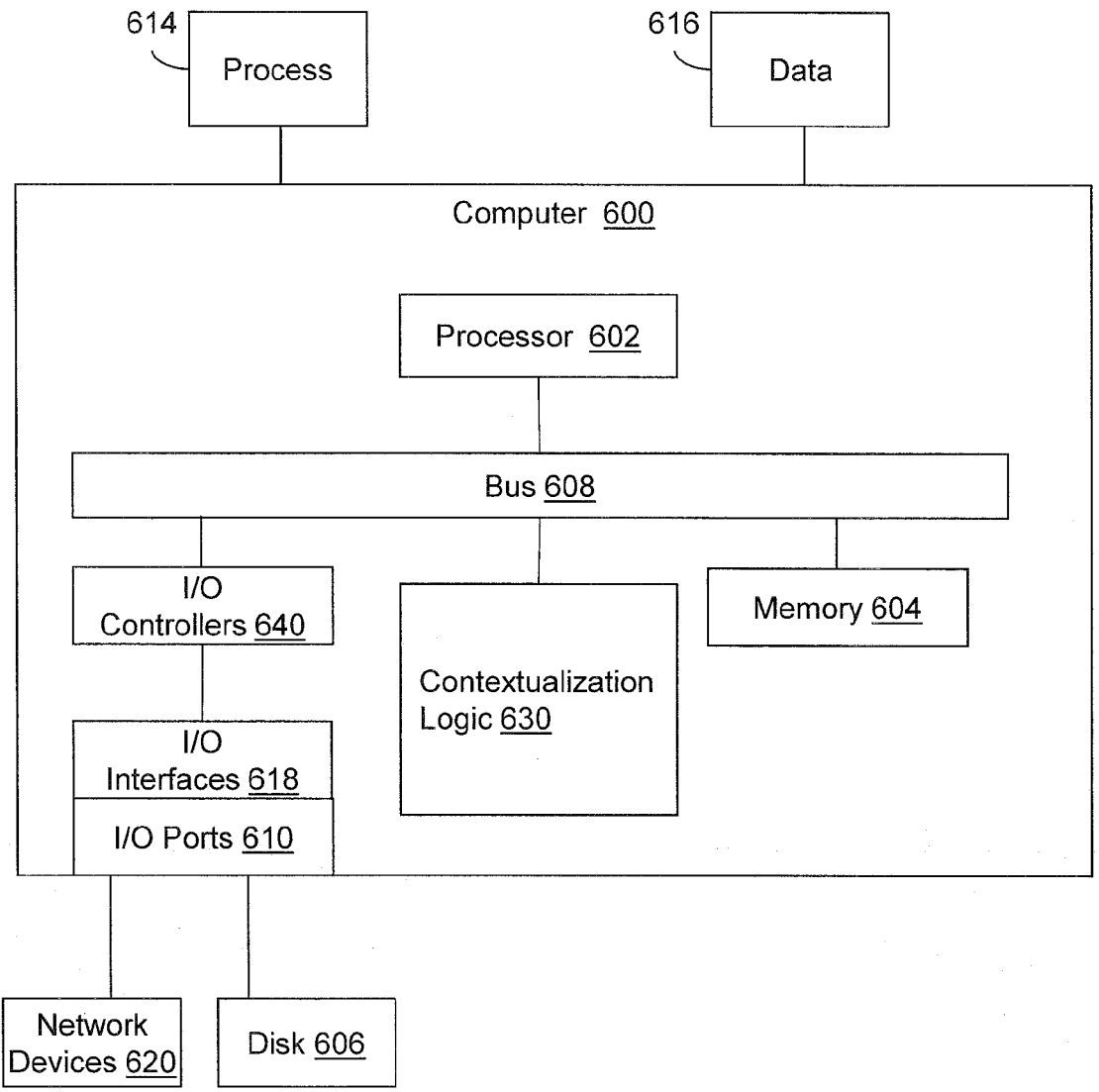
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a contextualization logic 630 configured to facilitate data rationalization. In different examples, the contextualization logic 630 may be implemented in hardware, software stored as computer executable instructions on a computer-readable medium, firmware, and/or combinations thereof. While the contextualization logic 630 is illustrated as a hardware component attached to the bus 608, it is to be appreciated that in one example, the contextualization logic 630 could be implemented in the processor 602.

Thus, contextualization logic 630 may provide means (e.g., hardware, instructions stored as computer executable instructions on a computer-readable medium, firmware) for accessing stored operation status data from production-related equipment; means (e.g., hardware, instructions stored as computer executable instructions on a computer-readable medium, firmware) for accessing stored energy consumption data for the production-related equipment; means (e.g., hardware, instructions stored as computer executable instructions on a computer-readable medium, firmware) for correlating the operation status data with the energy consumption data; means (e.g., hardware, instructions stored as computer executable instructions on a computer-readable medium, firmware) for categorizing energy consumed by the production-related equipment as value-added or non-value-added based, at least in part, on the correlating of the operation status data with the energy consumption data.

The contextualization logic 630 may provide means (e.g., hardware, instructions stored as computer executable instructions on a computer-readable medium, firmware) for accessing production scheduling data that identifies one or more products being processed by the production-related equipment; means (e.g., hardware, instructions stored as computer executable instructions on a computer-readable medium, firmware) for correlating the production scheduling data with categorized energy consumption; means (e.g., hardware, instructions stored as computer executable instructions on a computer-readable medium, firmware) for providing categorized energy consumption data aggregated according to the one or more products being processed by the production-related equipment.

The means may be implemented, for example, as an ASIC (application specific integrated circuit) programmed to rationalize data. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM (compact disk) drive, a CD-R (CD recordable) drive, a CD-RW (CD rewriteable) drive, a DVD (digital versatile disk and/or digital video disk) ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCI (peripheral component interconnect), PCIE (PCI express), 1394, USB (universal serial bus), Ethernet). The bus 608 can be types including, for example, a memory bus, a memory controller, a peripheral bus, an external bus, a crossbar switch, and/or a local bus.

The computer 600 may interact with input/output devices via the I/O interfaces 618 and the input/output ports 610 by way of I/O controllers 640. I/O devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN (local area network), a WAN (wide area network), and other networks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
   accessing stored operation status data from production-related equipment configured to manufacture a product, where the operation status data indicates whether the production-related equipment is engaged in manufacturing the product or not engaged in manufacturing the product;
   accessing stored energy consumption data for the production-related equipment;
   correlating the operation status data with the energy consumption data; and
   categorizing energy consumed by the production-related equipment as value-added or non-value-added based, at least in part, on the correlating of the operation status data with the energy consumption data, where energy consumed by the production-related equipment is categorized as i) value-added when the production-related equipment is engaged in manufacturing the product, or ii) non-value-added when the production-related equipment is not engaged in manufacturing the product.

2. The non-transitory computer-readable medium of claim 1, the instructions further comprising:
   storing the operation status data as a function of time;
   storing the energy consumption data as a function of time; and
   categorizing energy consumed by the production-related equipment by identifying energy consumption data that corresponds, in time, to operation status data that indicates that the production-related equipment is engaged in manufacturing the product as value-added energy.

3. The non-transitory computer-readable medium of claim 1, the instructions further comprising providing a user interface to allow a user to classify one or more production-related equipment status values as indicating that the production-related equipment is engaged in manufacturing the product or indicating that the production-related equipment is not engaged in manufacturing the product.

4. The non-transitory computer-readable medium of claim 1, the instructions further comprising:
   accessing production scheduling data that identifies one or more products being manufactured by the production-related equipment;
   correlating the production scheduling data with categorized energy consumption; and
   providing categorized energy consumption data aggregated according to the one or more products being manufactured by the production-related equipment.

5. A computing system comprising:
   electronic storage medium for storing energy consumption data for production-related equipment and operational status data for the production-related equipment, where the production-related equipment is configured to manufacture a product, and further where the operation status data indicates whether the production-related equipment is engaged in manufacturing the product or not engaged in manufacturing the product; and
   a contextualization engine configured to:
      access stored operation status data and stored energy consumption data;
      correlate the operation status data with the energy consumption data; and
      categorize energy consumed by the production-related equipment as value-added or non-value-added based, at least in part, on the correlating of the operation status data with the energy consumption data, where energy consumed by the production-related equipment is categorized as value-added when the production-related equipment is engaged in manufacturing the product or ii) non-value-added when the production-related equipment is not engaged in manufacturing the product.

6. The computing system of claim 5 where:
   the electronic storage medium stores the operation status data and the energy consumption data as a function of time; and
   the contextualization engine is further configured to categorize energy consumed by the production-related equipment by identifying energy consumption data that corresponds, in time, to operation status data that indicates that the production-related equipment is engaged in manufacturing the product as value-added energy.

7. The computing system of claim 5 where the contextualization engine is further configured to provide a user interface to allow a user to classify one or more production-related equipment status values as indicating that the production-related equipment is engaged in manufacturing the product or indicating that the production-related equipment is not engaged in manufacturing the product.

8. The computing system of claim 5 where the contextualization engine is further configured to:
   access production scheduling data that identifies one or more products being manufactured by the production-related equipment;
   correlate the production scheduling data with categorized energy consumption; and
   provide categorized energy consumption data aggregated according to the one or more products being manufactured by the production-related equipment.

9. The computing system of claim 5 where the contextualization engine comprises:

means for accessing stored operation status data from production-related equipment;
means for accessing stored energy consumption data for the production-related equipment;
means for correlating the operation status data with the energy consumption data; and
means for categorizing energy consumed by the production-related equipment as value-added or non-value-added based, at least in part, on the correlating of the operation status data with the energy consumption data.

10. The computing system of claim 9 where the contextualization engine further comprises:
means for accessing production scheduling data that identifies one or more products being manufactured by the production-related equipment;
means for correlating the production scheduling data with categorized energy consumption; and
means for providing categorized energy consumption data aggregated according to the one or more products being manufactured by the production-related equipment.

11. A non-transitory computer-readable medium storing computer-executable instructions that when executed by a computer cause the computer to perform a method, the method comprising:
determining an energy classification for an energy-consuming entity by accessing a hierarchical model of energy-consuming entities to determine a production classification for the entity, where an energy-consuming entity comprises a group of related energy-consuming equipment entities, and further where a production classification of production-related for an energy-consuming entity results in an energy classification of direct energy consumption for the energy-consuming entity;
identifying child entities of the energy-consuming entity;
aggregating the energy consumption data for the energy-consuming entity and the child entities; and
classifying the aggregated energy consumption data with the energy classification for the energy-consuming entity.

12. The non-transitory computer-readable medium of claim 11, where the energy-consuming entity has a production classification of production-related and at least one of the child entities has a production classification of non-production-related and where the classifying comprises classifying the aggregated energy consumption data as direct energy consumption.

13. The non-transitory computer-readable medium of claim 11, where a production classification of non-production-related for an energy-consuming entity results in an energy classification of indirect energy consumption for the energy-consuming entity.

14. The non-transitory computer-readable medium of claim 13, where the energy-consuming entity has a production classification of non-production-related and at least one of the child entities has a production classification of production-related and where the classifying comprises classifying the aggregated energy consumption data as indirect energy consumption.

15. A computing system comprising:
electronic storage medium for storing energy consumption data for production-related equipment and operational status data for the production related equipment; and
a contextualization engine comprising:
means for determining an energy classification for an energy-consuming entity by accessing a hierarchical model of energy-consuming entities to determine a production classification for the entity, where an energy-consuming entity comprises a group of related energy-consuming equipment entities, further where a production classification of production-related for an energy-consuming entity results in an energy classification of direct energy consumption for the energy-consuming entity;
means for identifying child entities of the energy-consuming entity;
means for accessing energy consumption data for the energy-consuming entity and the child entities;
means for aggregating the energy consumption data for the energy-consuming entity and the child entities;
means for classifying the aggregated energy consumption data as direct energy consumption when the energy-consuming entity has a production classification of production-related and at least one of the child entities has a production classification of non-production-related
and
means for classifying the aggregated energy consumption data with the energy classification for the energy-consuming entity.

16. The computing system of claim 15 where the contextualization engine further comprises means for classifying the aggregated energy consumption data as indirect energy consumption when the energy-consuming entity has a production classification of non-production-related and at least one of the child entities has a production classification of production-related.

* * * * *

UNITED STATES PATENT AND TRADEMARK OFFICE
CERTIFICATE OF CORRECTION

PATENT NO. : 8,577,486 B2  Page 1 of 1
APPLICATION NO. : 13/006475
DATED : November 5, 2013
INVENTOR(S) : Unver et al.

It is certified that error appears in the above-identified patent and that said Letters Patent is hereby corrected as shown below:

In the Specification

In column 1, line 63, delete ""(KPIs))" and insert -- (KPIs) --, therefor.

In column 5, line 38, delete "entity," and insert -- entity. --, therefor.

In column 6, line 7, delete "KR" and insert -- KPI --, therefor.

Signed and Sealed this
Third Day of June, 2014

Michelle K. Lee
*Deputy Director of the United States Patent and Trademark Office*